(12) United States Patent
Wen et al.

(10) Patent No.: US 12,617,449 B1
(45) Date of Patent: May 5, 2026

(54) LOW PROFILE ENERGY ABSORPTION STRAP LOCK MECHANISM

(71) Applicant: Steering Solutions IP Holding Corporation, Saginaw, MI (US)

(72) Inventors: Shenbing (Assur) Wen, Suzhou (CN); Yanyan Chen, Suzhou (CN); Guohui Hou, Zhoukou (CN); Hongwei (Kevin) Song, Kunshan (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 19/070,046

(22) Filed: Mar. 4, 2025

(30) Foreign Application Priority Data

Feb. 27, 2025 (CN) .......................... 202510229207.4

(51) Int. Cl.
| | |
|---|---|
| *B62D 1/19* | (2006.01) |
| *B62D 1/181* | (2006.01) |
| *B62D 1/185* | (2006.01) |
| *F16F 7/12* | (2006.01) |
| *B62D 1/189* | (2006.01) |

(52) U.S. Cl.
CPC ............. *B62D 1/185* (2013.01); *B62D 1/181* (2013.01); *B62D 1/192* (2013.01); *F16F 7/123* (2013.01); *B62D 1/189* (2013.01)

(58) Field of Classification Search
CPC .......... B62D 1/19; B62D 1/192; B62D 1/195; B62D 1/197; B62D 1/16; B62D 1/18; B62D 1/181; B62D 1/183; B62D 1/185; B62D 1/187; B62D 1/189; F16F 7/12; F16F 7/123

USPC ........................... 280/775, 777; 74/492, 493
See application file for complete search history.

(56) References Cited

U.S. PATENT DOCUMENTS

| 11,767,051 | B2 * | 9/2023 | Kim | B62D 1/192 |
| | | | | 74/493 |
| 2013/0233117 | A1 * | 9/2013 | Read | B62D 1/192 |
| | | | | 74/493 |
| 2015/0232117 | A1 * | 8/2015 | Stinebring | B62D 1/181 |
| | | | | 74/493 |

(Continued)

FOREIGN PATENT DOCUMENTS

| CN | 210191573 U | * | 3/2020 |
|---|---|---|---|
| CN | 210191574 U | * | 3/2020 |
| CN | 219487547 U | * | 8/2023 |

*Primary Examiner* — Keith J Frisby
(74) *Attorney, Agent, or Firm* — Dickinson Wright PLLC

(57) ABSTRACT

A steering column assembly includes a lower jacket. The steering column assembly also includes an upper jacket disposed within the lower jacket and being telescopingly adjustable relative to the lower jacket. The steering column assembly further includes a telescope drive assembly. The telescope drive assembly includes an electric actuator for actuating rotation of a threaded rod. The telescope drive assembly also includes a telescope drive nut threaded to the threaded rod. The telescope drive assembly further includes a telescope drive bracket coupled to the upper jacket and to a nut extension block of the telescope drive nut to axially adjust the upper jacket during movement of the telescope drive nut and the telescope drive bracket. The steering column assembly also includes an energy absorption strap disposed between the nut extension block and the telescope drive bracket.

18 Claims, 4 Drawing Sheets

(56)          References Cited

U.S. PATENT DOCUMENTS

| | | | | |
|---|---|---|---|---|
| 2016/0046318 A1* | 2/2016 | Stinebring | ............. | B62D 1/181 |
| | | | | 74/493 |
| 2017/0120945 A1* | 5/2017 | Stinebring | ............. | B62D 1/181 |
| 2017/0361863 A1* | 12/2017 | Rouleau | ................. | B62D 1/195 |
| 2018/0099687 A1* | 4/2018 | Stinebring | ............. | B62D 1/195 |
| 2019/0126968 A1* | 5/2019 | Messing | ................ | B62D 1/181 |
| 2019/0322307 A1* | 10/2019 | Kwon | .................... | B62D 1/181 |
| 2020/0172147 A1* | 6/2020 | Caverly | ................ | B62D 1/195 |
| 2020/0207401 A1* | 7/2020 | Martinez | ................ | B62D 1/185 |
| 2021/0024121 A1* | 1/2021 | Matsuno | ............... | B62D 1/195 |
| 2022/0135114 A1* | 5/2022 | Vermeersch | ........... | B62D 1/192 |
| | | | | 74/493 |
| 2023/0192176 A1* | 6/2023 | Tinnin | ................... | B62D 1/195 |
| | | | | 280/775 |
| 2023/0242174 A1* | 8/2023 | Caverly | .................. | B62D 1/19 |
| | | | | 280/775 |
| 2023/0257017 A1* | 8/2023 | Wu | ........................ | B62D 1/185 |
| | | | | 74/493 |
| 2023/0365183 A1* | 11/2023 | Raich | ..................... | B62D 1/195 |
| 2024/0239399 A1* | 7/2024 | Hauhoff | ................. | B62D 1/192 |
| 2024/0336295 A1* | 10/2024 | Sedlmeier | ............. | B62D 1/189 |
| 2025/0187648 A1* | 6/2025 | Bodtker | ................. | B62D 1/195 |

\* cited by examiner

LOW PROFILE ENERGY ABSORPTION STRAP LOCK MECHANISM

CROSS REFERENCE TO RELATED APPLICATION

This application claims the benefits of priority to Chinese Patent Application No. 202510229207.4, filed Feb. 27, 2025, the disclosure of which is incorporated by reference herein in its entirety.

TECHNICAL FIELD

The following description relates to vehicle steering systems and, more particularly, to a low profile energy absorption strap lock mechanism for vehicle steering systems having electrically powered adjustability.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column assembly for translating steering input to an output that interacts with a steering linkage to ultimately cause the vehicle wheels to turn. Steering columns often include various safety features, such as airbags to lessen impact forces. In addition, many steering column assemblies are collapsible and include one or more energy absorption features, such as energy absorption straps. Some energy absorption straps are configured to roll along their length to absorb energy, and are often referred to as roll straps. Typically, roll straps absorb energy during the deformation of the strap in an impact event wherein kinetic energy can be dissipated through compression of the steering column assembly.

In power telescoping (i.e., translating) steering columns, a telescope drive bracket is used to connect a telescope actuator to an upper jacket to carry out telescoping motion of the upper jacket relative to a lower jacket. A portion of the energy absorption strap and a strap bracket are coupled to the upper jacket and extend over a length that protrudes to an extent which requires a radially protruding bridge to allow the energy absorption strap and/or the strap bracket therethrough during axial adjustment of the steering column. The radially protruding bridge requires a large packaging space and introduces challenges for compliance with OEM spatial requirements.

SUMMARY

According to one aspect of the disclosure, a steering column assembly includes a lower jacket. The steering column assembly also includes an upper jacket disposed within the lower jacket and being telescopingly adjustable relative to the lower jacket. The steering column assembly further includes a telescope drive assembly. The telescope drive assembly includes an electric actuator for actuating rotation of a threaded rod. The telescope drive assembly also includes a telescope drive nut threaded to the threaded rod. The telescope drive assembly further includes a telescope drive bracket coupled to the upper jacket and to a nut extension block of the telescope drive nut to axially adjust the upper jacket during movement of the telescope drive nut and the telescope drive bracket. The steering column assembly also includes an energy absorption strap disposed between the nut extension block and the telescope drive bracket.

According to another aspect of the disclosure, an integrated energy absorption apparatus and telescope drive assembly includes an electric actuator for actuating rotation of a threaded rod. The assembly also includes a telescope drive nut threaded to the threaded rod. The assembly further includes a telescope drive bracket coupled to the upper jacket and to a nut extension block of the telescope drive nut to axially adjust the upper jacket during movement of the telescope drive nut and the telescope drive bracket. The telescope drive bracket includes a base plate coupled to the upper jacket, wherein the base plate of the telescope drive bracket is directly coupled to the upper jacket with a first fastener and a second fastener. The telescope drive bracket also includes a pair of flanges extending radially outwardly from the base plate, wherein the telescope drive bracket is coupled to the nut extension block of the telescope drive nut with at least one fastener extending through a coupling portion of each of the pair of flanges. The assembly also includes an energy absorption strap disposed between the nut extension block and the telescope drive bracket.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering systems, for example, steer-by-wire and driver interface steering. These steering systems typically include a steering column assembly for translating steering input to an output that interacts with a steering linkage to ultimately cause the vehicle wheels to turn. Steering columns include various safety features, such as airbags to lessen impact forces. In addition, many steering columns are collapsible and include one or more energy absorption features, such as energy absorption straps, which allow a certain amount of compression.

Figure 1:
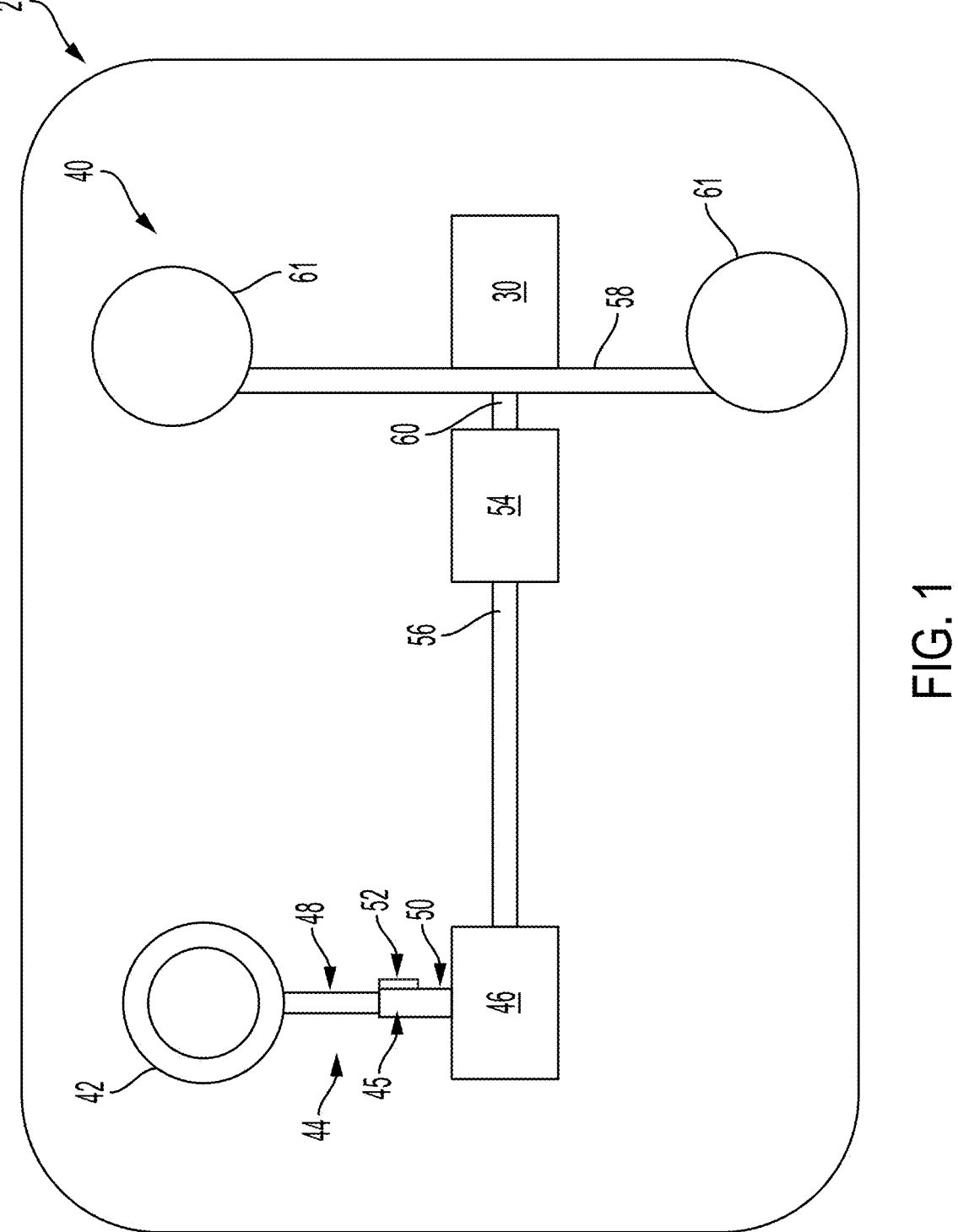
FIG. 1 schematically depicts a steering system including a power adjustable steering column assembly.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 may include a steering column 45 that extends along a longitudinal axis A from the input device 42 to an output assembly 46. The output assembly 46 may include a pinion shaft assembly, an I-shaft, a cardan joint, steer-by-wire components or any other features conventionally located opposite the input device 42.

The steering column 45 may include at least two axially adjustable portions, for example, an upper jacket 48 and a lower jacket 50 that are axially adjustable with respect to one another. The upper jacket 48 and the lower jacket 50 are permitted to move axially with respect to one another during an impact or other compressive forces. The relative axial movement is described herein as being telescoping, wherein the upper jacket 48 telescopes within the lower jacket 50 over a range of axial positions from an extended column position to a retracted column position. The steering column assembly 44 may include additional portions and may be capable of rake and/or tilt movement as well.

An energy absorption apparatus 52 is coupled to the upper jacket 48 to provide stroke load absorption settings. During a collapse event, a force may move, or "collapse", the upper jacket 48 along the longitudinal axis A of the steering column 45. The energy absorption apparatus 52 dissipates at least some of the kinetic energy of the first jacket 48 during collapse into the second jacket 50. The details of the energy absorption apparatus 52 are described herein.

A steering gear assembly 54 may connect to the output assembly 46 via a steering gear input shaft 56. The steering gear assembly 54 may be configured as a rack-and-pinion, a recirculating ball-type steering gear, or any other type of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn road wheels 61.

Figure 2:
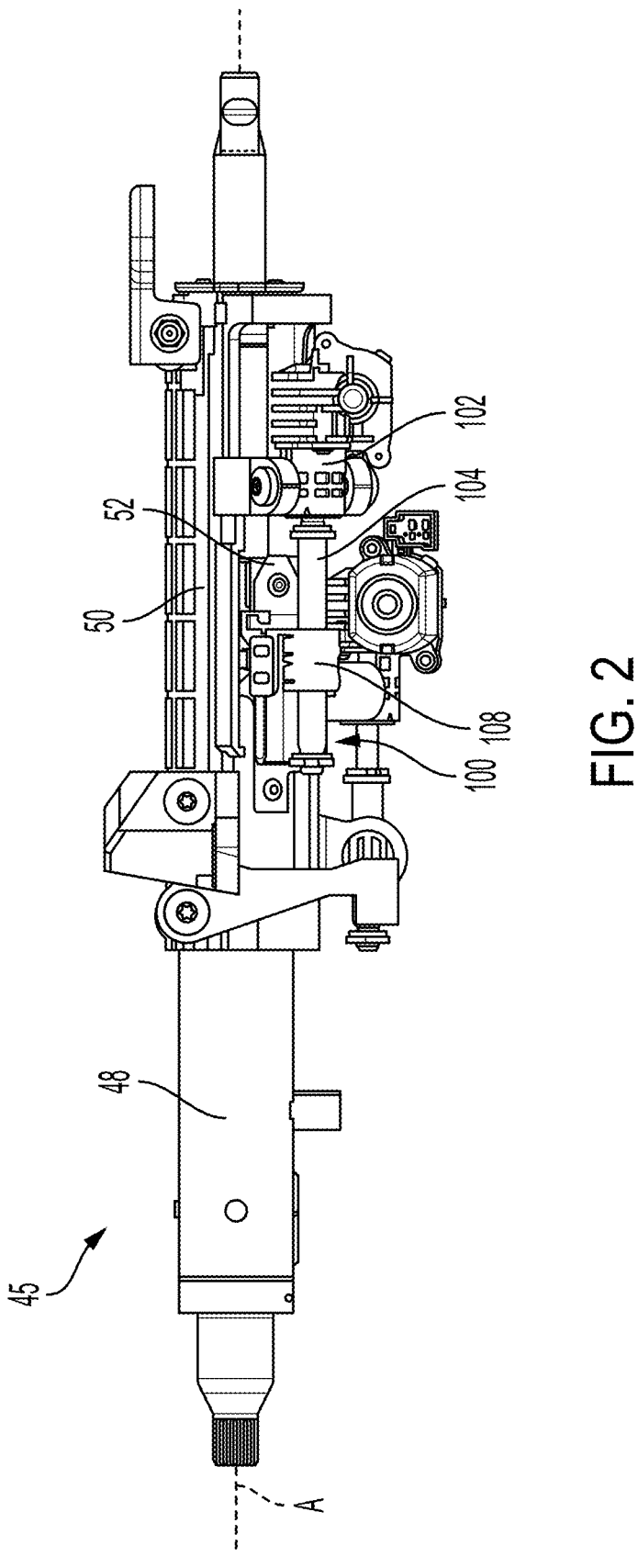
FIG. 2 is a side, elevation view of the power adjustable steering column assembly having an energy absorption lock mechanism and telescope actuator assembly.

FIG. 2 illustrates a portion of the steering column 45, the energy absorption apparatus 52 and a telescope drive assembly 100. The telescope drive assembly 100 is a powered actuator which actuates telescoping movement of the upper jacket 48 relative to the lower jacket 50. The telescope drive assembly 100 includes an electric actuator 102, such as an electric motor, that drives rotational movement of a threaded rod 104. A gearbox may facilitate the transfer of power from an output shaft of the electric actuator 102 to the threaded rod 104. Rotation of the threaded rod 104 results in translation of a telescope drive nut 108 which is threaded to an outer surface of the threaded rod 104. Translation of the telescope drive nut 108 is substantially parallel to the longitudinal axis A of the steering column 45. The telescope drive nut 108 may be any suitable type of nut, such as a jackscrew nut, for example.

The energy absorption apparatus 52 and the telescope drive assembly 100 are assembled to each other and packaged in an arrangement which reduces the overall axial length of the energy absorption apparatus 52 and the telescope drive assembly 100. Due to the reduction of axial length (relative to longitudinal direction of steering column 45), the need for a significantly raised bridge in the region generally referenced with X formed in the lower jacket 50 is eliminated, thereby reducing the radial footprint of a portion of the steering column, as shown in FIGS. 3 and 4.

Figure 4:
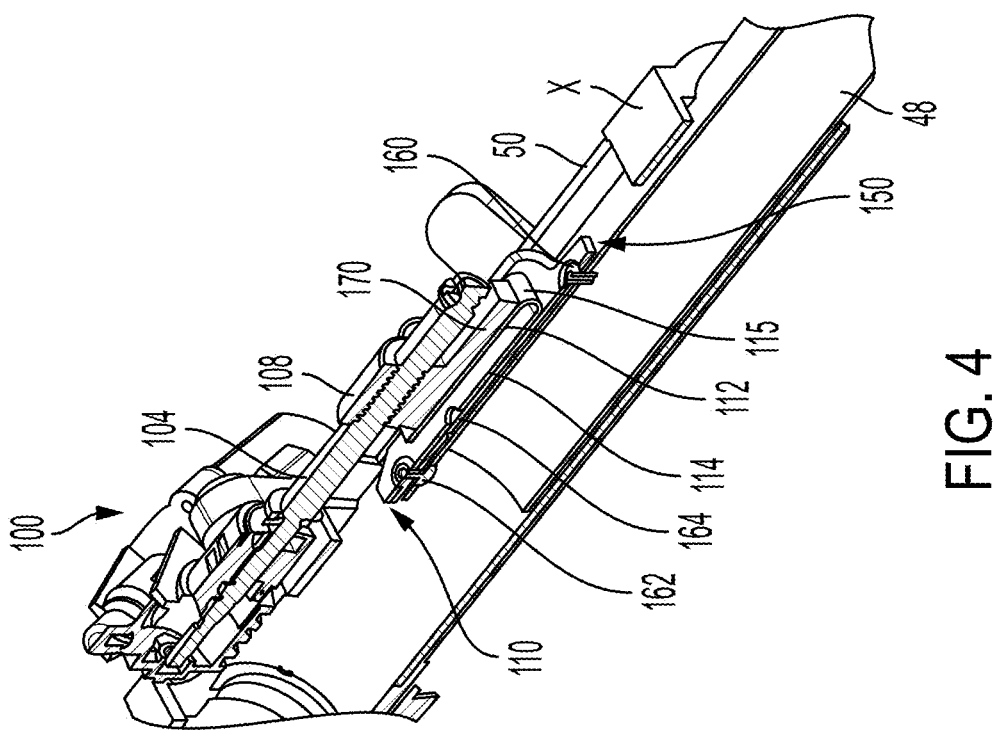
FIG. 4 is a perspective, cross-sectional view of the energy absorption lock mechanism and the telescope actuator assembly.
Figure 3:
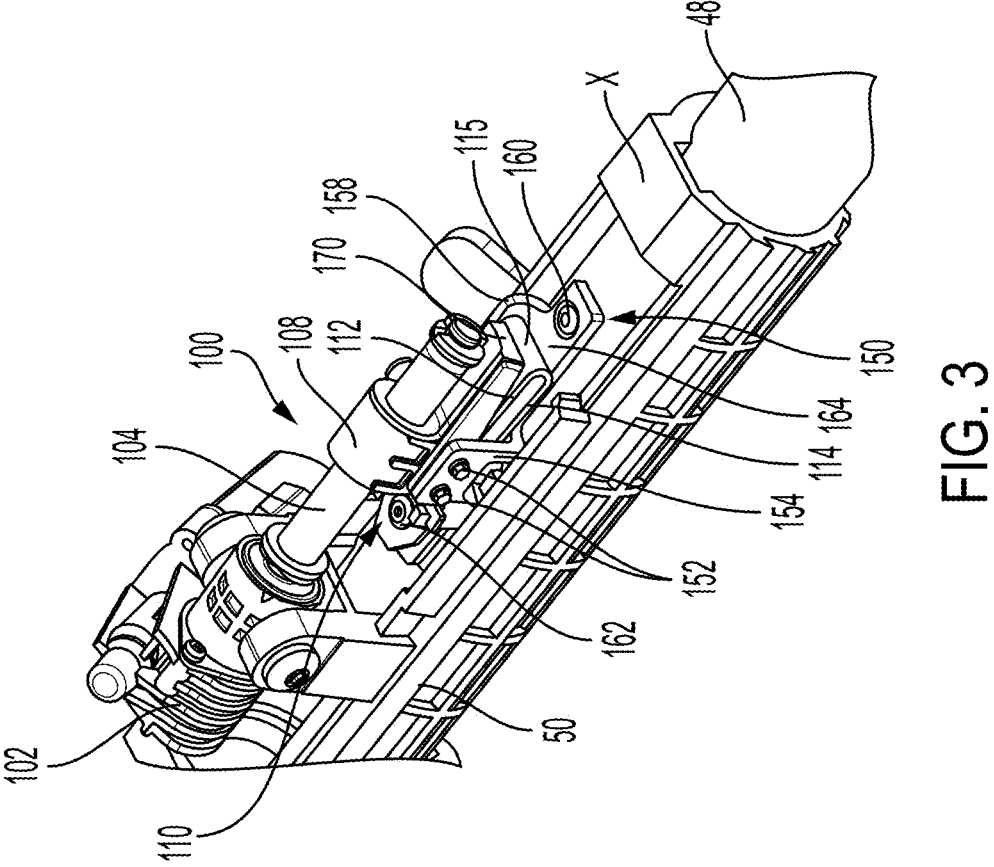
FIG. 3 is a perspective view of the energy absorption lock mechanism and telescope actuator assembly.

Referring now to FIGS. 3 and 4, the energy absorption apparatus 52 and the telescope drive assembly 100 are shown in greater detail. The telescope drive nut 108 of the telescope drive assembly 100 [is] travels along the threaded rod 104 during actuation by the electric actuator 102. The telescope drive nut 108 is operatively coupled to a telescope drive bracket 150. Coupling of the telescope drive nut 108 to the telescope drive bracket 150 may be made with any suitable fasteners, such as bolts, screws, rivets, or the like. In the illustrated embodiments, a first pair of fasteners 152 secure the telescope drive nut 108 to a first side flange 154 of the telescope drive bracket 150 and a second pair of fasteners 156 secure the telescope drive nut 108 to a second side flange 158 of the telescope drive bracket 150 (see also FIGS. 5 and 6). However, it is to be understood that more or fewer fasteners may be provided on each side flange 154, 158 of the telescope drive bracket 150 in some embodiments and coupling may be made on only one side flange in some embodiments. The telescope drive bracket 150 is directly coupled to a radially outer surface of the upper jacket 50 with any suitable fastener(s), such as bolts, screws, rivets, or the like. In the illustrated embodiment, a first fastener 160 couples the telescope drive bracket 150 to the upper jacket 48 at a first location and a second fastener 162 couples the telescope drive bracket 150 to the upper jacket 48 at a second location. In particular, the fasteners 160, 162 extend through a base plate 164 of the telescope drive bracket 150 to connect the telescope drive bracket 150 to the upper jacket 48. The above-described couplings result in axial movement of the upper jacket 48, relative to the lower jacket 50, during movement of the telescope drive nut 108 along the threaded rod 104.

The energy absorption apparatus 52 includes an energy absorption strap 110 having a radially outer leg 112, a radially inner leg 114, and a curved portion 115 connecting the outer leg 112 and the inner leg 114. The energy absorption strap 110 is generally U-shaped in the illustrated embodiments, but S-shaped straps or other geometries are contemplated. The second fastener 162, which couples the telescope drive bracket 150 to the upper jacket 48, also couples the energy absorption strap 110 to the telescope drive bracket 150 and the upper jacket 48. In particular, the second fastener 162 extends through the radially inner leg 114 of the energy absorption strap 110 and the base plate 164 of the telescope drive bracket 150.

The energy absorption strap 110 is sandwiched between the base plate 164 of the telescope drive bracket 150 and a nut extension block 170 which is operatively coupled to, or integrally formed with, the telescope drive nut 108. Specifically, the radially outer leg 112 of the energy absorption strap 110 is adjacent to, and in contact with, the radially inner side of the nut extension block 170 and the radially inner leg 114 is adjacent to, and in contact with, the base plate 164 of the telescope drive bracket 150. The energy absorption strap 110 is also disposed between the side flanges 154, 158 of the telescope drive bracket 150, which extend radially outwardly from the base plate 164.

Figure 6:
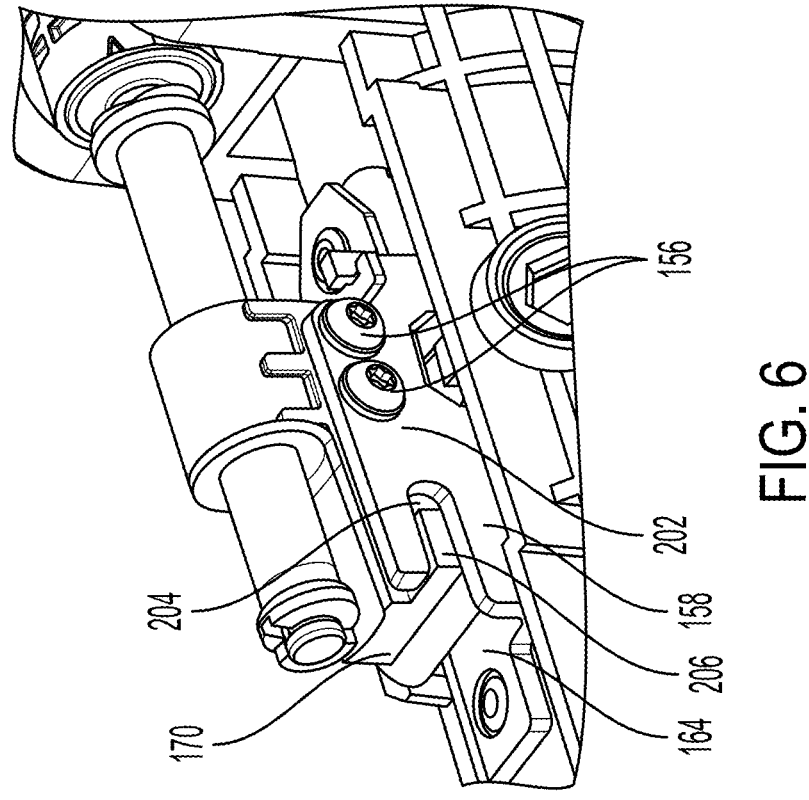
FIG. 6 is a perspective view of a second embodiment of a telescope drive bracket of the telescope actuator assembly.
Figure 5:
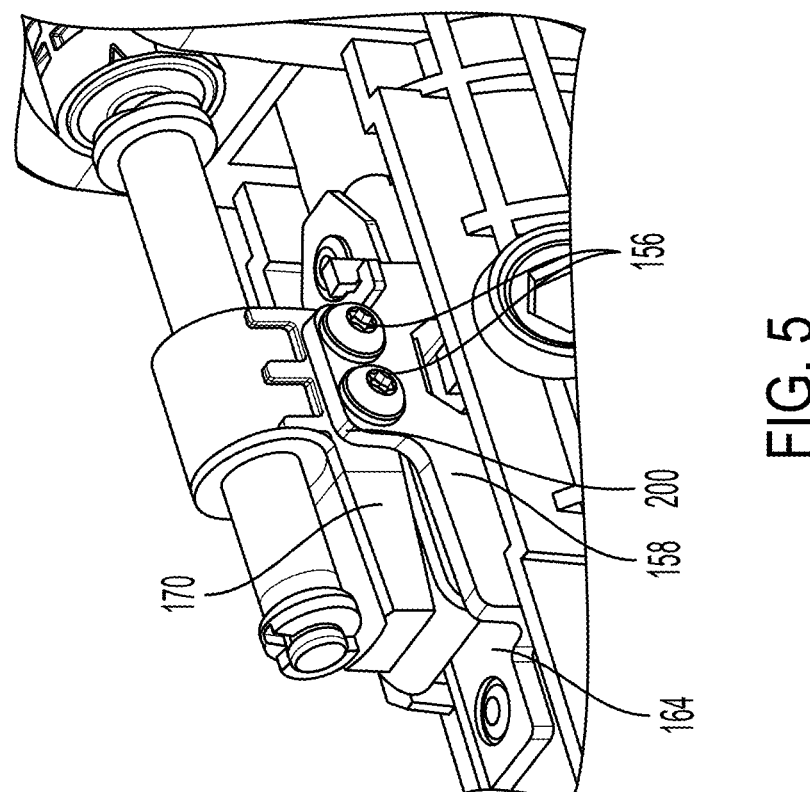
FIG. 5 is a perspective view of a first embodiment of a telescope drive bracket of the telescope actuator assembly.

FIGS. 5 and 6 illustrate different embodiments of the side flanges 154, 158 of the telescope drive bracket 150 and the nut extension block 170. In particular, FIG. 5 illustrates a coupling portion 200 of the flange which accommodates coupling of the telescope drive bracket 150 to the nut extension block 170 of the telescope drive nut 108 which does not extend axially more than one-half of the length of the nut extension block 170. FIG. 6 includes a coupling portion 202 which accommodates the fasteners for coupling of the telescope drive bracket 150 to the nut extension block 170, but extends axially more than one-half of the length of the nut extension block 170 and includes a cutout 204 which receives a laterally protruding segment 206 of the nut extension block 170 therein to provide greater stability to the overall assembly during operation.

The embodiments disclosed herein constrain the energy absorption strap 110 during an energy absorption event without the need for additional strap brackets that require additional axial length of the overall system, thereby eliminating the need for a large bridge to receive a portion of the energy absorption apparatus 52 therein. Constraint of the energy absorption strap 110 ensures a desired energy absorption profile during rolling of the strap 110.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A steering column assembly comprising:
a lower jacket;
an upper jacket disposed within the lower jacket and being telescopingly adjustable relative to the lower jacket;
a telescope drive assembly comprising:
    an electric actuator for actuating rotation of a threaded rod;
    a telescope drive nut threaded to the threaded rod; and
    a telescope drive bracket coupled to the upper jacket and to a nut extension block of the telescope drive nut to axially adjust the upper jacket during movement of the telescope drive nut and the telescope drive bracket; and an energy absorption strap disposed between the nut extension block and the telescope drive bracket.

2. The steering column assembly of claim 1, wherein the telescope drive bracket comprises:
a base plate coupled to the upper jacket; and
a pair of flanges extending radially outwardly from the base plate.

3. The steering column assembly of claim 2, wherein the telescope drive bracket is coupled to the nut extension block of the telescope drive nut with at least one fastener extending through a coupling portion of each of the pair of flanges.

4. The steering column assembly of claim 3, wherein the coupling portion of at least one of the pair of flanges extends axially more than one-half of the length of each of the pair of flanges.

5. The steering column assembly of claim 4, wherein the coupling portion of at least one of the pair of flanges defines a cutout to receive a laterally protruding segment of the nut extension block.

6. The steering column assembly of claim 3, wherein the coupling portion of at least one of the pair of flanges extends axially less than one-half of the length of each of the pair of flanges.

7. The steering column assembly of claim 2, wherein the base plate of the telescope drive bracket is directly coupled to the upper jacket with a first fastener and a second fastener.

8. The steering column assembly of claim 7, wherein the energy absorption strap comprises:
a radially outer leg;
a radially inner leg; and
a curved portion connecting the radially outer leg and the radially inner leg.

9. The steering column assembly of claim 8, wherein the radially inner leg of the energy absorption strap is directly coupled to the base plate of the telescope drive bracket with the second fastener.

10. The steering column assembly of claim 9, wherein the radially outer leg is adjacent to, and in contact with, the nut extension block, wherein the radially inner leg is adjacent to, and in contact with, the base plate of the telescope drive bracket.

11. The steering column assembly of claim 8, wherein the energy absorption strap is disposed within respective inner edges of the pair of flanges of the telescope drive bracket.

12. An integrated energy absorption apparatus and telescope drive assembly comprising:
an electric actuator for actuating rotation of a threaded rod;
a telescope drive nut threaded to the threaded rod; and
a telescope drive bracket coupled to an upper jacket and to a nut extension block of the telescope drive nut to axially adjust the upper jacket during movement of the telescope drive nut and the telescope drive bracket, wherein the telescope drive bracket comprises:
    a base plate coupled to the upper jacket, wherein the base plate of the telescope drive bracket is directly coupled to the upper jacket with a first fastener and a second fastener; and
    a pair of flanges extending radially outwardly from the base plate, wherein the telescope drive bracket is coupled to the nut extension block of the telescope drive nut with at least one fastener extending through a coupling portion of each of the pair of flanges; and
an energy absorption strap disposed between the nut extension block and the telescope drive bracket.

13. The integrated energy absorption apparatus and tele-scope drive assembly of claim 12, wherein the energy absorption strap comprises:

a radially outer leg;

a radially inner leg; and a curved portion connecting the radially outer leg and the radially inner leg, wherein the radially inner leg of the energy absorption strap is directly coupled to the base plate of the tele-scope drive bracket with the second fastener.

14. The integrated energy absorption apparatus and tele-scope drive assembly of claim 13, wherein the radially outer leg is adjacent to, and in contact with, the nut extension block, wherein the radially inner leg is adjacent to, and in contact with, the base plate of the telescope drive bracket.

15. The integrated energy absorption apparatus and tele-scope drive assembly of claim 12, wherein the energy absorption strap is disposed within respective inner edges of the pair of flanges of the telescope drive bracket.

16. The integrated energy absorption apparatus and tele-scope drive assembly of claim 12, wherein the coupling portion of at least one of the pair of flanges extends axially more than one-half of the length of each of the pair of flanges.

17. The integrated energy absorption apparatus and tele-scope drive assembly of claim 16, wherein the coupling portion of at least one of the pair of flanges defines a cutout to receive a laterally protruding segment of the nut extension block.

18. The integrated energy absorption apparatus and tele-scope drive assembly of claim 12, wherein the coupling portion of at least one of the pair of flanges extends axially less than one-half of the length of each of the pair of flanges.

* * * * *